United States Patent
Vivian

[15] 3,682,431
[45] Aug. 8, 1972

[54] SEAT SUSPENSION SYSTEM
[72] Inventor: Frank H. Vivian, Ottawa, Kans.
[73] Assignee: Daybrook-Ottawa Corporation, Ottawa, Kans.
[22] Filed: Aug. 14, 1970
[21] Appl. No.: 63,817

[52] U.S. Cl..................................................248/400
[51] Int. Cl............................................F16m 13/00
[58] Field of Search....248/15, 22, 23, 350, 399, 400, 248/401; 267/131, 132, 133; 272/58

[56] References Cited

UNITED STATES PATENTS

| 2,880,782 | 4/1959 | Conner | 248/399 |
| 98,063 | 12/1869 | Hurtt | 248/399 |
| 2,770,433 | 11/1956 | McNally | 248/22 |
| 3,330,598 | 7/1967 | Whiteside | 297/DIG. 3 |

Primary Examiner—William H. Schultz
Attorney—Fishburn, Gold and Litman

[57] ABSTRACT

A seat suspension system for mobile vehicles includes an inflatable resilient member secured in position between a base member and a seat member wherein the base member is fixedly mounted on the mobile vehicle and has a plurality of spaced guides upstanding therefrom to cooperatively engage posts depending from the seat member which has a seat mounted thereon and means communicating with the inflatable resilient member for controlling the inflation thereof to pneumatically cushion the seat and absorb relative movement between the seat and base members.

6 Claims, 5 Drawing Figures

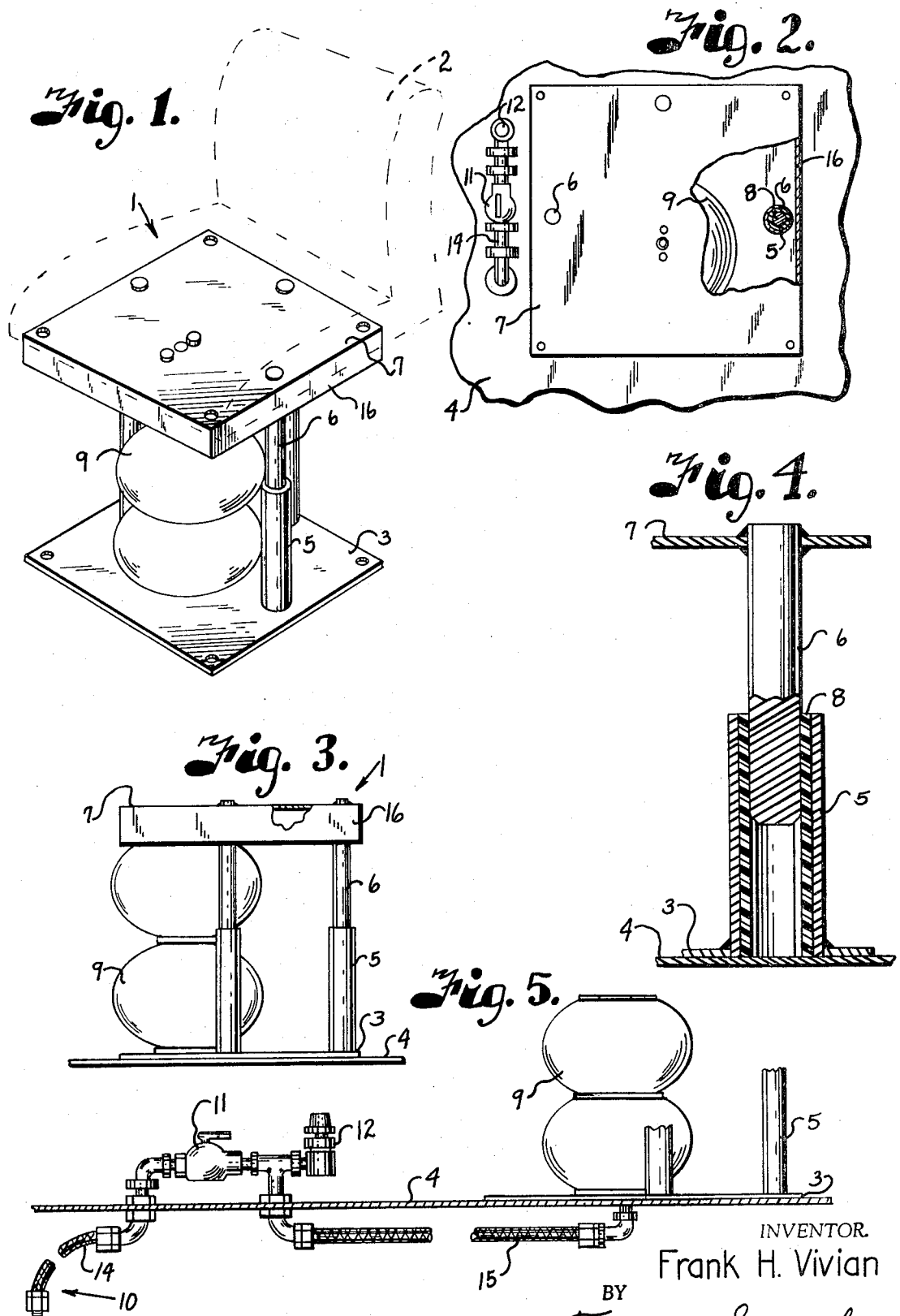

SEAT SUSPENSION SYSTEM

The present invention relates to a seat suspension system for vibration developing apparatus and more particularly to a pneumatic vibration absorbing mounting for vehicle seats in heavy vehicles, such as cross-country trucks, tractors for trailer units, earth moving vehicles, including shovels, hauling carriers, bulldozers, other on and off the road equipment, and the like.

The principal objects of the present invention are: to provide a seat suspension system for mobile vehicles which has an improved cushioning action and shock insulating factor between the vehicle and a driver or passenger therein; to provide such a seat suspension system having an inflatable resilient member permitting relative vertical movement between the mobile vehicle and the seat and having vertical guides which restrain relative lateral movement between the seat and vehicle; to provide such a seat suspension system wherein rough road bumps which are translated through the frame and floor of a moving vehicle to a supporting member are absorbed in an inflatable resilient member between a base member and a seat member and which permits relative movement between the base and seat members; to provide such a seat suspension system particularly designed to insulate the seat from the up and down movement of the supporting structure in response to the contour of the surface traveled by the mobile vehicle; to provide such a seat suspension system having adjustable valve members communicating with the inflatable resilient member for controlling the amount of pressure therein to pneumatically cushion a seat supported thereon; to provide such a seat suspension system which reduces driver or operator fatigue, reduces operator turnover, increases operator morale, maintains operator efficiency, and is safe in operation; and to provide such a seat suspension system which is economical to construct, durable in use, adjustable during travel, effective in operation, and particularly well adapted for the proposed use.

Other objects and advantages of this invention will become apparent from the following description taken in connection with the accompanying drawings wherein are set forth by way of illustration and example certain embodiments of this invention.

FIG. 1 is a perspective view of a seat suspension system embodying features of the present invention.

FIG. 2 is a plan view of the seat suspension system.

FIG. 3 is a side elevational view of the seat suspension system.

FIG. 4 is an enlarged fragmentary sectional view through the seat suspension system showing the cooperative engagement between guides and posts for permitting relative vertical movement and restraining relative lateral movement within the seat suspension system.

FIG. 5 is a schematic view of conduit and valve means for controlling the inflation of an inflatable resilient member in the seat suspension system.

Referring more in detail to the drawings:

The reference numeral 1 generally designates a seat suspension structure for resiliently and pneumatically supporting a vehicle seat 2 within a mobile vehicle (not shown) and insulating same from vibration and shock translated through a frame and floor structure of the vehicle in response to irregularities in a surface traveled over by the mobile vehicle thereby minimizing operator or driver fatigue and maintaining driver efficiency and productivity.

In the illustrated structure, a base or support plate 3 is suitable secured to a floor structure 4, as by bolts or welding, within the cab or operator's compartment of the mobile vehicle. The base or support plate 3 has a plurality of spaced guides 5 extending upwardly therefrom to cooperatively engage a like plurality of guides 6 depending from a mounting plate or seat member 7 having the vehicle's seat 2 mounted thereon. In the illustrated structure, the guides 5 are tubular members and the guides 6 are posts which are arranged for each post 6 to be received within a respective guide 5 and the plates 3 and 7 are positioned in substantially parallel spaced apart relation with the support plate 3 having three tubular guides 5 extending upwardly therefrom and the mounting plate 7 having three posts 6 depending therefrom to be received within the respective guides 5.

While the guides 5 and the posts 6 permit relative pneumatically cushioned generally vertical movement between the seat 2 and the floor structure 4, it is desirable to restrain relative lateral movement therebetween, therefore, a sleeve bearing 8 is positioned within each of the guides 5 and is engageable by the respective post 6 received therein.

Each of the sleeve bearings 8 and the respective post 6 have a minimum clearance therebetween whereby relative lateral movement between the vehicle seat and floor structure 4 is substantially restrained. The sleeve bearings 8 are preferably formed of a synthetic resin, such as a phenol-formaldehyde resin, and are suitably secured within the tubular guides 5, as by glue or a silicone sealant.

Vibration and shock translated through the frame and floor structure 4 of the mobile vehicle, such as resulting from the mobile vehicle traveling over irregular surfaces, is pneumatically cushioned and absorbed by an inflatable resilient member 9 positioned between and secured to the base or support plate 3 and the mounting plate 7, as later described, thereby separating same and substantially cushioning relative generally vertical movement between the support and mounting plates 3 and 7.

The inflatable resilient member 9 is illustrated as one or more air bags each having substantially rigid end members and a flexible intermediate portion therebetween which is expandable outwardly of the end members thereby separating same when air under pressure is directed into the respective air bag. When the air bag or bags are filled with air under pressure, a substantial weight may be supported on the end members.

The end members of the illustrated air bags and the base plate 3 and mounting plate or seat member 7 are drilled to receive suitable fastening devices, such as capscrews, for securing the inflatable resilient member 9 in position between the plates 3 and 7 thereby supporting the plate 7 and the seat 2 in spaced relation with the floor structure 4 of the respective vehicle.

In the illustrated structure, the guides 5 and posts 6 are arranged in a generally triangular pattern with a guide 5 and post 6 on each side of the inflatable resilient member 9 and a guide 5 and post 6 positioned at the center of a rear portion of the seat suspension structure 1.

It is desirable to provide means communicating with the inflatable resilient member 9 for controlling the inflation thereof whereby the vehicle seat 2 mounted on the mounting plate 7 is pneumatically cushioned against relative movement between the seat 2 and the floor structure 4 and it is also desirable to provide means for adjusting the inflation of the inflatable resilient member 9 to conform to individual desires of the operator of the mobile vehicle.

In the illustrated structure, a source of air under pressure, such as an air compressor (not shown) operated by the engine of the respective mobile vehicle is communicated to the inflatable resilient member 9 through conduit means 10 and the conduit means 10 has an adjustable supply valve 11 therein for inflating the resilient inflatable member 9. The conduit means 10 has an adjustable relief valve 12 therein which is positioned between the supply valve 11 and the inflatable resilient member 9 for allowing excess pressure to escape thereby adjusting the amount of inflation of the inflatable resilient member 9 to conform to a desired pressure and to vary the pressure as required by terrain changes, such as from cross-country travel to highway travel and the like.

The supply valve 11 and relief valve 12 are preferably positioned within easy reach of a driver or operator on the vehicle seat 2, therefore, a first conduit portion 14 extends between the source of air under pressure and the floor structure 4. The first conduit portion 14 communicates with the supply valve 11 and the relief valve 12 which are positioned above the floor structure 4 and adjacent the support plate 3 mounted thereon. A second conduit portion 15 extends between the supply and relief valves 11 and 12 and the inflatable resilient member 9 with the connection of the second conduit portion 15 to the inflatable resilient member 9 extending through the floor structure 4 and the support plate 3.

It is desirable to at least partially enclose the inflatable resilient member 9 particularly in open top vehicles used in heavy construction and earth moving operations, such as bulldozers, and the like, therefore, a skirt member 16 depends from the mounting plate 7 on the exposed peripheral side edges thereof to at least partially enclose the inflatable resilient member 9 thereby protecting same and providing an improved or finished appearance for the seat suspension structure 1.

In using the seat suspension structure 1, constructed as illustrated and described, the operator or driver of the mobile vehicle sits on the vehicle seat 2 and starts the engine of the respective mobile vehicle. The driver or operator then adjusts the supply valve 11 or relief valve 12, as desired, thereby adjusting the inflation of the inflatable resilient member 9 to the desired pressure, as determined by the weight of the respective operator or driver and the anticipated terrain. During traveling of the vehicle, shocks or vibrations resulting from irregularities in the terrain or the highway over which the vehicle is traveling are transferred through the frame and floor structure 4 to the inflatable resilient member 9. The vehicle seat 2, mounting plate 7, and the posts 6 depending therefrom are pneumatically cushioned against relative generally vertical movement of the floor structure 4, base or support plate 3, and the guides 5 extending upwardly therefrom in response to the contour of the surface traveled by the mobile vehicle. The inflatable resilient member 9 supports the mounting plate 7 and the vehicle seat 2 thereon and pneumatically cushions and substantially insulates the driver or operator from road vibration and shocks and permits relative vertical movement between the seat 2 and the floor structure 4 while the guides 5 and posts 6 restrain relative lateral movement between the seat 2 and floor structure 4 thereby maintaining the driver or operator in a position having access to the controls and proper visibility of the instruments of the respective vehicle.

It is to be understood that while I have illustrated and described one form of my invention, it is not to be limited to the specific form or arrangement of parts herein described and shown

What I claim and desire to secure by Letters Patent is:

1. A seat suspension system comprising:
   a. a base member and a mounting member positioned in spaced apart relation;
   b. a vehicle seat mounted on said mounting member;
   c. an inflatable resilient member between and engaging said base member and said mounting member thereby separating same;
   d. a plurality of spaced generally parallel elongate guides fixed on and extending from one of said base member and mounting member;
   e. a like plurality of cooperating members extending from the other of said base member and mounting member and engageable with said respective guides for linear movement therealong whereby said base member and mounting member are arranged for guided movement toward and away from each other;
   f. said guides and the respective posts received therein being arranged in a generally triangular pattern with a guide and post on each side of the inflatable resilient member and a guide and post positioned adjacent the center of a rear portion of the seat suspension system;
   g. said inflatable resilient member being positioned forward of the side guides and posts; and
   h. means associated with said inflatable resilient member for controlling the inflation thereof whereby relative movement between said base member and mounting member is pneumatically cushioned.

2. A seat suspension system as set forth in claim 1 wherein:
   a. said guides are each tubular members;
   b. said cooperating members are posts and are received within respective guides;
   c. said guides each have a bearing therein engageable by said respective post received therein; and
   d. said bearings and said respective post received therein have a minimum clearance between whereby relative lateral movement between said base member and mounting member is substantially restrained.

3. A seat suspension system as set forth in claim 2 wherein said inflatable resilient member has one end fixed relative to said base member and the other end fixed relative to the mounting member whereby said base and mounting members are substantially restrained.

4. A seat suspension system as set forth in claim 3 wherein said inflation controlling means include:
  a. a source of air under pressure;
  b. conduit means communicating said inflatable resilient member with said source of air under pressure; and
  c. adjustable valve means in said conduit means for selectively adjusting the amount of inflation of said inflatable resilient member.

5. A seat suspension system as set forth in claim 4 including a skirt member depending from the mounting member having the seat mounted thereon to at least partially enclose said inflatable resilient member.

6. A seat suspension system comprising:
  a. a base member and a mounting member positioned in spaced apart relation, said base member being adapted to be fixedly mounted in a mobile vehicle;
  b. a plurality of spaced tubular guides extending from one of the fixedly mounted base member and mounting member toward the other; c. a like plurality of generally parallel posts extending from the other of the mounting member and base member and arranged for each post to be received within a respective guide;
  d. an inflatable resilient member between and secured to said base member and mounting member thereby separating same; e. means communicating with said inflatable resilient member for controlling the inflation thereof whereby relative movement between said base member and a seat mounted on the mounting member is pneumatically cushioned;
  f. a source of air under pressure adapted to be mounted on the mobile vehicle; g. conduit means communicating said source of air under pressure with said inflatable resilient member;
  h. adjustable valve means in said conduit means for selectively adjusting the amount of pressure within said inflatable resilient member, said adjustable vale means being positioned within reach of a person on the seat; i. a bearing within each of said guides and engageable by said respective post received therein, each of said bearings and said respective post received therein having a minimum clearance therebetween whereby relative lateral movement between said base member and mounting member is substantially restrained;
  j. a skirt member depending from the base member having the seat mounted thereon to at least partially enclose said inflatable resilient member; k. said guides and the respective posts received therein being arranged in a generally triangular pattern with a guide and post on each side of the inflatable resilient member and a guide and post positioned adjacent the center of a rear portion of the seat suspension system;
  l. said inflatable resilient member being positioned forward of the side guides and posts; and
  m. said adjustable valve means of said inflation controlling means including an adjustable supply valve for inflating said inflatable resilient member and an adjustable relief valve for allowing escape of excess pressure from said inflatable resilient member thereby adjusting the amount of inflation therein.

* * * * *